Nov. 20, 1934.　　　A. W. SCHOOF　　　1,981,153
MEASURING APPARATUS
Filed Sept. 9, 1930
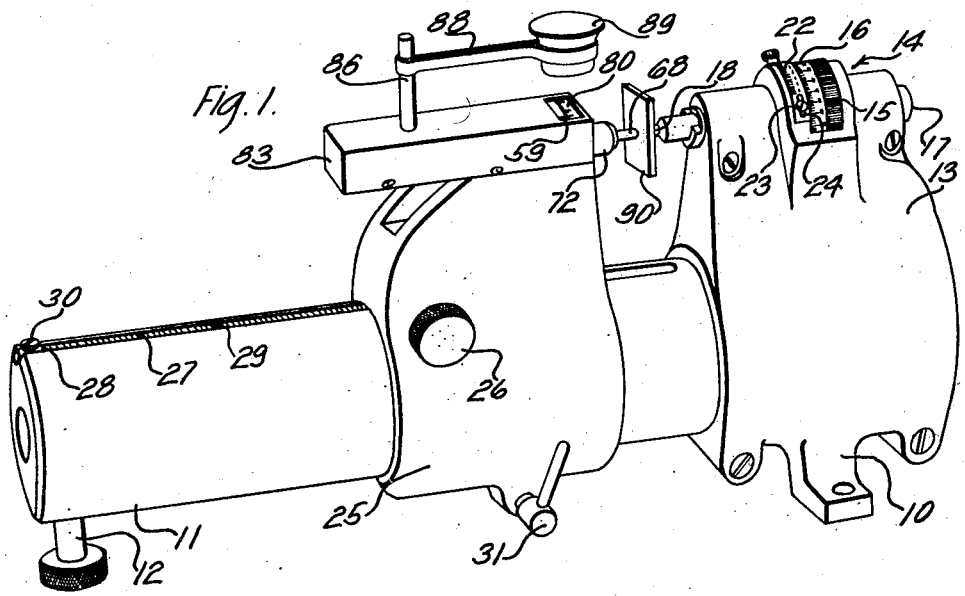
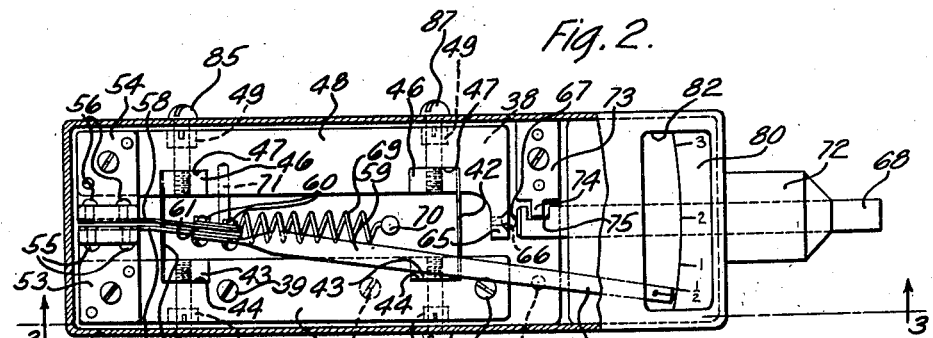
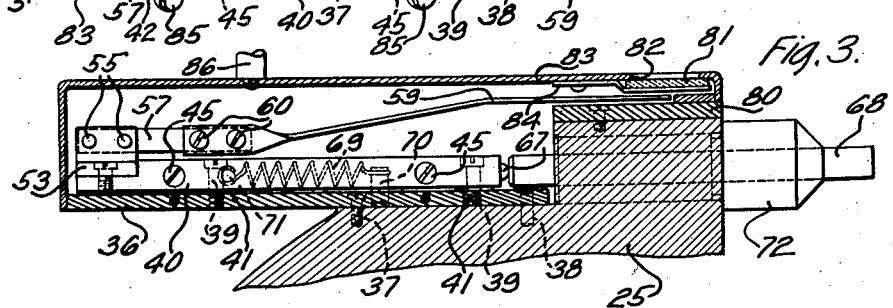
Inventor
A. W. Schoof
By J.H.B. Whitfield Atty.

Patented Nov. 20, 1934

1,981,153

UNITED STATES PATENT OFFICE 1,981,153

MEASURING APPARATUS

Arthur W. Schoof, Riverside, Ill., assignor to Western Electric Company, Incorporated, New York, N. Y., a corporation of New York Application September 9, 1930, Serial No. 480,666

1 Claim. (Cl. 33—147)

This invention relates to measuring apparatus, and more particularly to apparatus for accurately measuring linear dimensions.

An object of the present invention is the provision of a measuring instrument having a high degree of accuracy by insuring that articles being measured will be subjected to the same pressure.

In accordance with one embodiment, the invention contemplates the provision of a micrometer for measuring linear dimensions wherein a fixed head supports a micrometer screw spindle and a movable head carries a spring pressed plunger which actuates an indicator to indicate the degree of pressure applied by the micrometer screw spindle upon the article. The plunger carried by the movable head is resiliently mounted and upon a predetermined amount of pressure being applied to the article due to the manipulation of the micrometer screw, the pressure will be indicated on a graduated scale so that an accurate measurement may be made by invariably subjecting the article to the same pressure irrespective of whether the measurement is being made by the same operator or by a different operator.

A better understanding of the invention will be had by reference to the following detailed description when taken in conjunction with the accompanying drawing, wherein Fig. 1 is a view in perspective of a measuring instrument embodying the features of the invention;

Fig. 2 is a plan view, parts being broken away, showing in detail the indicating mechanism for indicating the amount of pressure applied to the article by the micrometer spindle, and Fig. 3 is a sectional view taken along the line 3—3 of Fig. 2 in the direction of the arrows.

Referring now to the drawing wherein like reference characters designate the same parts throughout the several views, the numeral 10 indicates generally a base comprised of a horizontal arm 11 the outer or left end (Fig. 1) of which is supported by an adjustable support 12. Formed integral with the base 10 is a stationary head 13 which has mounted therein a micrometer designated generally by the numeral 14. This micrometer is of the usual type and comprises a knurled, manually actuated screw 15 which has a graduated dial 16 formed thereon, and which actuates a threaded measuring spindle 17 carrying at its left end (Fig. 1) an anvil 18 of the usual type. The graduated dial 16 cooperates with a vernier dial 22 mounted upon the stationary head 13 and adjustably secured thereto by means of a set screw 23 which cooperates with a slot 24 formed in the vernier dial. The operation and purpose of this will become apparent as the description progresses.

An adjustable head 25 is mounted upon the horizontally extending arm 11 and may be moved to the right or left (Fig. 1) by means of a knurled thumb screw 26 positioned in the movable head 25 and cooperating with a raised screw thread 27 mounted on the horizontally extending arm 11. This raised screw thread may be of any well known type and as shown in the present embodiment comprises a threaded rod 28 positioned in a slot 29 formed in the horizontally extending arm 11 and secured by means of a screw 30. As will be apparent from the foregoing, the movable head 25 may be moved toward or away from the stationary head 13 by rotating thumb screw 26. After being moved to the desired position, the movable head 25 may be locked in place by means of a locking screw 31 positioned adjacent the bottom thereof and operable in the usual manner.

Positioned on the adjustable head 25 is a plate 36 which may be secured in position by means of a screw 37 and dowels 38 and which has secured thereto by screws 39, a block 40, shims or washers 41 being interposed between the block 40 and plate 36 to raise the block slightly from the plate, the purpose of which will become apparent as the description progresses. A pair of horizontally disposed reed springs 42 are secured in a pair of retaining members 43 which fit in apertures 44 formed in the block 40, being secured in place therein by screws 45. The opposite ends of the reed springs 42 are secured in similar retaining members 46 held in apertures 47 in a block 48 by screws 49. The block 48 is somewhat similar in construction to the block 40 but differs therefrom in that it is not secured to the base plate 36, but is supported wholly by the horizontally disposed reed springs 42, and since the block 40 is raised from the upper surface of the base plate 36 by the shims or washers 41, the block 48 does not engage the base plate 36.

A pair of L-shaped members 53 and 54 are secured to the blocks 40 and 48, respectively, at the left end (Figs. 2 and 3) thereof, and have secured to the vertically extending portions thereof by rivets 55 and 56, a pair of resilient metallic members 57 and 58, respectively. The right ends of the resilient metallic members 57 and 58 (Figs. 2 and 3) are secured to an indicating arm 59 and to each other by nut and bolt assemblies 60, a spacing element 61 being positioned between the resilient metallic members.

It will be noted by reference to Fig. 2 that the block 48 has a projection 65 formed thereon in which is formed a depression 66 for receiving a ball 67 to provide a substantially frictionless engagement between the projection and a plunger 68. A coil spring 69 having one end thereof secured to a pin 70 mounted in the base plate 36 and the other end thereof secured to a pin 71, mounted in the block 48, normally tends to move the block 48 to the right (Fig. 2) thereby to move the plunger 68 to the right (Fig. 2). The pin 70 may be made adjustable in any well known manner to permit movement thereof for the purpose of correcting the pressure exerted by the spring 69. The plunger 68 is slidably positioned in a guide 72 fixed in the upper end of the movable head 25, and is restrained from movement to the right or left (Figs. 2 and 3) beyond predetermined limits by a stop member 73 secured to the base plate 36 and having a projecting arm 74 thereof extending into a slot 75 formed in the plunger 68. The plunger 68, upon movement to the left against the action of the spring 69, will tend to move the block 48 to the left and cause the indicating arm 59 to be moved across the face of a scale 80 (Fig. 2) an amount proportional to the amount of movement of the plunger.

The scale 80 has indicia inscribed thereon for indicating the amount of pressure exerted against the plunger 68. The scale 80 is mounted upon the movable head 25 and may be viewed through a glass plate 81 held in place under an aperture 82 formed in a casing 83 by means of a bracket 84. The casing 83 is secured to the base plate 36 by means of screws 85, and serves to keep dust and dirt from getting into the delicate parts of the pressure indicating mechanism. Secured to the upper portion of the casing 83 is a standard 86 having mounted thereon a horizontally disposed arm 88 which serves to support a magnifying lens 89 positioned directly over the aperture 82 in the casing 83 to aid in reading the pressure indicated by the indicating arm 59.

It is believed that a better understanding of the invention will be had by referring to the following description of the operation thereof.

An operator desiring to measure the thickness of a piece of metal 90 (Fig. 1) which is of a thickness not greater than the thrust of the spindle 17, may place the article to be measured between the anvil 18 and the plunger 68, and by means of the knurled screw 15 advance the spindle 17 carrying the anvil 18 into engagement with the piece of metal 90 with the desired amount of pressure exerted thereon as determined by the standard pressure to be exerted in measuring articles of the type in which the metal piece 90 falls.

The pressure exerted upon the article 90 will be indicated with a great degree of accuracy by the indicator arm 59 in cooperating with the scale 80 due to the fact that there is a practically frictionless operation of the gaging means, the only frictional points of engagements in the apparatus being the sliding of the plunger 68 through the guide 72, and between the ball 67 and the plunger. The plunger 68, upon being moved to the left, due to the pressure exerted thereupon by the advancing of the spindle 17 to the left (Figs. 1 and 2), will move the block 48 to the left and since the block 48 is supported solely by the reed springs 42, its movement will be not only toward the left, but also toward block 40. This movement will tend to draw the resilient metallic member 58 to the left and since the resilient metallic member 57 is secured against movement, the effect of such movement of the member 58 is to cause the indicator arm 59 to be moved across the face of the scale 80. It will be apparent from the foregoing that the movement of the indicating arm 59 will always be proportional to the movement of the plunger 68, but the movement imparted to the indicating arm will be much greater than that imparted to the plunger 68, thereby permitting a great magnification of the movement of the plunger. It will also be apparent that the pressure exerted upon the plunger may thus be accurately measured due to the fact that there is no lost motion and a minimum of friction between the moving parts which might cause error. The provision of this pressure indicating mechanism permits the reading of the pressure exerted within very close limits.

In measuring articles such as screws in which it is desired to determine the pitch diameter thereof, the standard amount of pressure to be exerted by the micrometer spindle upon the screw threads is determined by the number of threads per inch; for example, in screws having twenty threads per inch the standard pressure to be exerted in measuring them will differ from that to be used in measuring screws having forty threads per inch. By means of the apparatus described hereinbefore, the exact amount of pressure exerted by the spindle upon the article may be determined by using the pressure indicating device controlled by the plunger 68 and an accurate measurement may be had.

In measured articles having a greater linear dimension to be gaged than the thrust of the spindle 17, a member of predetermined thickness may be placed between the plunger 68 and anvil 18, the movable head may be moved transversely of the horizontally extending arm 11 by means of the knurled thumb nut 26 and locked in position with the vernier dial 22 and the dial 16 having their zero indicating lines coinciding, and the indicator arm 59 indicating the desired pressure. After the movable head 25 has been moved to the desired position and locked in place, variations in the positioning thereof due to backlash may be corrected by again gaging the member of predetermined thickness and with zero pressure exerted thereon adjusting the vernier so that its zero line will coincide with zero on the graduated dial 16. Having performed these operations, any linear dimension may be measured accurately and at the desired pressure by performing the steps as outlined hereinbefore for measuring articles whose linear dimension to be determined is known to be less than the amount of thrust of the spindle 17.

What is claimed is:

A measuring apparatus comprising a head, a micrometer screw and indicator carried by said head, a guide extending from said head, an opposing head movably mounted on said guide for adjustment toward and away from said first head, a pressure indicating device mounted on said movable head, said pressure indicating device and said micrometer screw being arranged to receive between them an article to be gaged, said pressure indicating device comprising an elongated element movable by engagement with an article being gaged, a flat spring attached at one end to said element and extending toward said article, another flat spring attached at one end to a relatively fixed part of said device and extending toward said article, said springs being spaced from each other by a distance which is small as compared with their lengths, an elongated indicating element to which the other ends of said springs are attached and which extends toward said article, and a scale traversed by said indicating element.

ARTHUR W. SCHOOF.